(12) United States Patent
Sugden et al.

(10) Patent No.: US 8,186,475 B2
(45) Date of Patent: May 29, 2012

(54) SUSPENDED OPERATOR PLATFORM

(75) Inventors: David J. Sugden, Horicon, WI (US); James W. Hall, Princeton, WI (US)

(73) Assignee: Metalcraft of Mayville, Inc., Mayville, WI (US)

( * ) Notice: Subject to any disclaimer, the term of this patent is extended or adjusted under 35 U.S.C. 154(b) by 251 days.

(21) Appl. No.: 12/778,669

(22) Filed: May 12, 2010

(65) Prior Publication Data

US 2011/0277433 A1 Nov. 17, 2011

(51) Int. Cl.
*B60K 26/00* (2006.01)
(52) U.S. Cl. ............ 180/326; 180/89.12; 180/89.13; 180/89.14
(58) Field of Classification Search ......... 180/89.12, 180/89.13, 89.14, 326, 329, 900; 280/124.179
See application file for complete search history.

(56) References Cited

U.S. PATENT DOCUMENTS

| | | | |
|---|---|---|---|
| 3,357,717 A | 12/1967 | Samford | |
| 3,572,828 A | 3/1971 | Lehner | |
| 3,774,711 A | 11/1973 | Lacey | |
| 3,784,219 A * | 1/1974 | Van Der Burgt et al. | 280/104 |
| 4,141,429 A | 2/1979 | Hale | |
| 4,198,092 A | 4/1980 | Federspiel | |
| 4,258,896 A | 3/1981 | Kato et al. | |
| 4,392,546 A | 7/1983 | Brown et al. | |
| 4,452,328 A | 6/1984 | Oudelaar | |
| 4,477,050 A | 10/1984 | Thompson et al. | |
| 4,662,597 A | 5/1987 | Uecker et al. | |
| 4,714,227 A | 12/1987 | Holm et al. | |
| 4,828,216 A | 5/1989 | Van Duser | |
| 4,930,593 A | 6/1990 | Swartzendruber et al. | |
| 4,941,641 A | 7/1990 | Granzow et al. | |
| 5,127,699 A * | 7/1992 | Maezawa et al. | 296/65.02 |
| 5,181,370 A | 1/1993 | Simone | |
| 5,367,864 A * | 11/1994 | Ogasawara et al. | 56/15.8 |
| 5,368,118 A | 11/1994 | Hoefle | |
| 5,388,801 A | 2/1995 | Edrich et al. | |
| 5,865,020 A | 2/1999 | Busboom et al. | |
| 5,946,893 A * | 9/1999 | Gordon | 56/15.8 |
| 6,460,318 B1 * | 10/2002 | Ferris et al. | 56/15.8 |
| 6,499,282 B1 * | 12/2002 | Velke et al. | 56/14.7 |
| 6,773,049 B2 * | 8/2004 | Rupiper et al. | 296/63 |
| 6,857,254 B2 * | 2/2005 | Melone et al. | 56/15.8 |
| 7,246,836 B2 | 7/2007 | Hahn | |
| 7,882,914 B2 | 2/2011 | Scheele et al. | |
| 2003/0024223 A1 | 2/2003 | Jager et al. | |
| 2006/0200287 A1 | 9/2006 | Parison et al. | |
| 2008/0202874 A1 | 8/2008 | Scheele et al. | |

FOREIGN PATENT DOCUMENTS

DE 32 08 680 C2 3/1982

(Continued)

*Primary Examiner* — Toan To
(74) *Attorney, Agent, or Firm* — Boyle Fredrickson, S.C.

(57) ABSTRACT

A suspended operator platform for use with a ride-on lawnmower or the like is connected to a rigid chassis of the ride-on lawnmower by a suspension system that has a parallelogram linkage. The operator platform supports an entire body of the operator and isolation mounts connect a seat assembly to the operator platform. Steering controls of the ride-on lawnmower are connected to the operator platform so that the steering controls move with the operator platform and are suspended and/or isolated from the chassis. The suspension system includes a course-stiffness adjuster and a fine-stiffness adjuster that adjust the suspension stiffness to correspond to a particular operator and/or terrain.

27 Claims, 11 Drawing Sheets

FOREIGN PATENT DOCUMENTS

| | | |
|---|---|---|
| DE | 39 04 225 A1 | 2/1989 |
| DE | 40 38 772 A1 | 6/1992 |
| DE | 195 47 009 A1 | 12/1994 |
| DE | 43 39 674 A1 | 6/1995 |
| DE | 202 16 233 U1 | 10/2001 |
| DE | 10 2004 017 118 A1 | 4/2004 |
| DE | 10 2004 027 202 A1 | 6/2004 |
| EP | 0 426 510 A1 | 9/1990 |
| EP | 0 466 664 A1 | 1/1992 |
| EP | 1 361 104 A1 | 11/2003 |
| EP | 1 433 692 A1 | 6/2004 |
| EP | 1 645 494 A2 | 4/2006 |
| EP | 1 816 026 A1 | 8/2007 |
| EP | 2 143 624 A1 | 1/2010 |
| EP | 2 223 845 A1 | 9/2010 |
| GB | 1 301 013 | 12/1972 |
| WO | 2006080495 | 8/2006 |

* cited by examiner

SUSPENDED OPERATOR PLATFORM

BACKGROUND OF THE INVENTION

1. Field of the Invention

The invention relates to off-road light duty vehicles such as lawnmowers and, more particularly, to a suspension system for a ride-on mower.

2. Discussion of the Related Art

Rider versions of self-propelled mowers or "ride-on mowers" are known in the lawn grooming or lawn care industries. Operators of ride-on mowers can mow for relatively long periods of time, since the operators are seated during use. Despite being seated while mowing, operating ride-on mowers can be physically demanding because the operators can be exposed to shocks, vibrations, or other loads, that are generated by the ride-on mower during use or that result from driving the ride-on mower across uneven terrain. Such vibrations, or shock-type or other loads, can transmit through the ride-on mower chassis, foot rest, seat, and controls, and into the legs, bodies, and arms of the operators. For the sake of convenience, these loads that are transmitted to the operator by or through the mower are simply referred to as "shock loads" herein for the sake of brevity.

Various attempts have been made to reduce the imposition of shock loads to operators by using suspension seats that are suspended by springs and/or dampers to isolate the seats from the chassis. However, such seat suspensions fail to reduce transmission of vibrations, or shock-type or other loads, through non-seat components. Accordingly, seat suspensions leave operators susceptible to exposure of shock loads through foot rests, controls, or components other than the seat that are in contact with the operator.

U.S. Patent Application Publication No. 2006/0290080 (the '080 application) discloses a ride-on mower that partially alleviates these problems by providing a platform that is isolated from a chassis by springs at each corner of the platform. The operator's seat is mounted on the platform, and the front portion of the platform serve as an operator footrest. While this system reduces the imposition of shock loads to the operator's feet, the corner mounted springs allow the platform to roll about a longitudinal axis, yaw, and transversely sway, to an extent permitted by a pair of hinges at the front of the platform and a stabilizer bar at the back of the platform. Despite being limited to some extent by the front hinges and back stabilizer bar, such partially limited movements may lead to oscillations of the platform relative to the chassis during certain operating conditions or may be perceived by an operator as being an undesirably loose connection between the platform and chassis. In addition, the steering levers are mounted directly to the chassis, whereby relative movements between the platform and chassis result in relative movements between an operator and the steering levers. Such relative movements between the operator and steering levers can give the steering levers a meandering feel during use, which may not be desirable. Furthermore, mounting the steering levers directly to the chassis allows vibrations, or shock-type or other loads, which are transmitted through the chassis, to also be transmitted through the steering levers and into the arms of the operator.

Yet other attempts have been made to reduce the imposition of shock loads to an operator by using chassis suspension systems that support the entire chassis, from wheels in a manner that is somewhat analogous to an automobile suspension. These systems usually take the form of a system of springs supporting the chassis on the wheels. Such chassis suspension systems are complex, expensive, and require substantial maintenance. They also must be sufficiently robust to support the entire chassis and everything supporting on it, including the seat, the operator, the mower deck, the drive train, etc. They also allow the mower deck to move with respect to underlying ground surfaces. This relative movement can lead to reduced cutting performance. For example, during rapid deceleration occurring during a braking event, the mower deck may "nose dive" or pitch downwardly further into the grass, resulting in "scalping" or an undesirably short cut during the nose-diving occurrence.

Typical suspension systems also provide non-adjustable stiffness deemed to be ideal for a "typical" operator weight. Of course, operators' weights vary dramatically, and even operators' of a given weight may have differences of opinion as to what is considered to be an ideal stiffness under prevailing operating conditions, which may themselves vary. For example, a given operator may prefer a stiffer suspension on smooth terrain than on a rougher or uneven terrain. Traditional suspension systems cannot accommodate these changing needs.

Prior art lawnmowers and other vehicles having suspension systems also tend to have relatively high centers of gravity, reducing the stability of the vehicles.

Many of the problems discussed above are also experienced by other light utility vehicles, such as all terrain vehicles having dumping load carrying beds. One such vehicle is manufactured by John Deere & Co. under the trade name Gator.

SUMMARY OF THE INVENTION

In light of the foregoing, a suspended operator platform of a lawnmower or other riding light utility vehicle is desired that improves the state of the art by overcoming one or more of the aforesaid problems of the prior art.

It is also desired to provide a suspended operator platform that suspends or isolates at least some controls from the rigid chassis of the ride-on mower. For instance, steering controls may be mounted on the suspended platform so as to move in unison with the suspended operator platform.

It is also desired to provide a suspension system that has a stiffness adjuster that is configured to accommodate for body weight differences of different users and/or to accommodate varying user preferences.

In accordance with an aspect of the invention, at least some of these desires are fulfilled by providing a suspended operator platform for use with a ride-on mower or other light utility vehicle. The suspended operator platform is connected to a rigid chassis of the ride-on mower by a suspension system that has a parallelogram linkage. The operator platform supports an entire body of the operator. Steering controls of the vehicle are connected to the operator platform so as to move with the remainder of the platform.

In accordance with another aspect of the invention, a vehicle suspension system for a light utility vehicle may include an operator stiffness adjuster that permits a seated operator to adjust the stiffness of the suspensions system. That stiffness adjuster may comprise a "fine" stiffness adjuster that can be utilized in conjunction with a separate, "course-stiffness adjuster," to provide for wider range of adjustment.

In accordance with another aspect of the invention, a vehicle suspension system for a light utility vehicle may include a system of linkages that permits the operator platform to swing fore and aft as a unit while preventing any side to side movement and/or any pitching or yawing movement.

In accordance with yet another aspect of the invention, an operator's seat is vibrationally isolated from a suspended operator platform by a system of elastomeric isolation mounts.

In accordance with another aspect of the invention, a coil over shock is aligned longitudinally and/or transversely with a center of gravity weight of the mower.

Various other features, embodiments and alternatives of the present invention will be made apparent from the following detailed description taken together with the drawings. It should be understood, however, that the detailed description and specific examples, while indicating preferred embodiments of the invention, are given by way of illustration and not limitation. Many changes and modifications could be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

Figure 1:
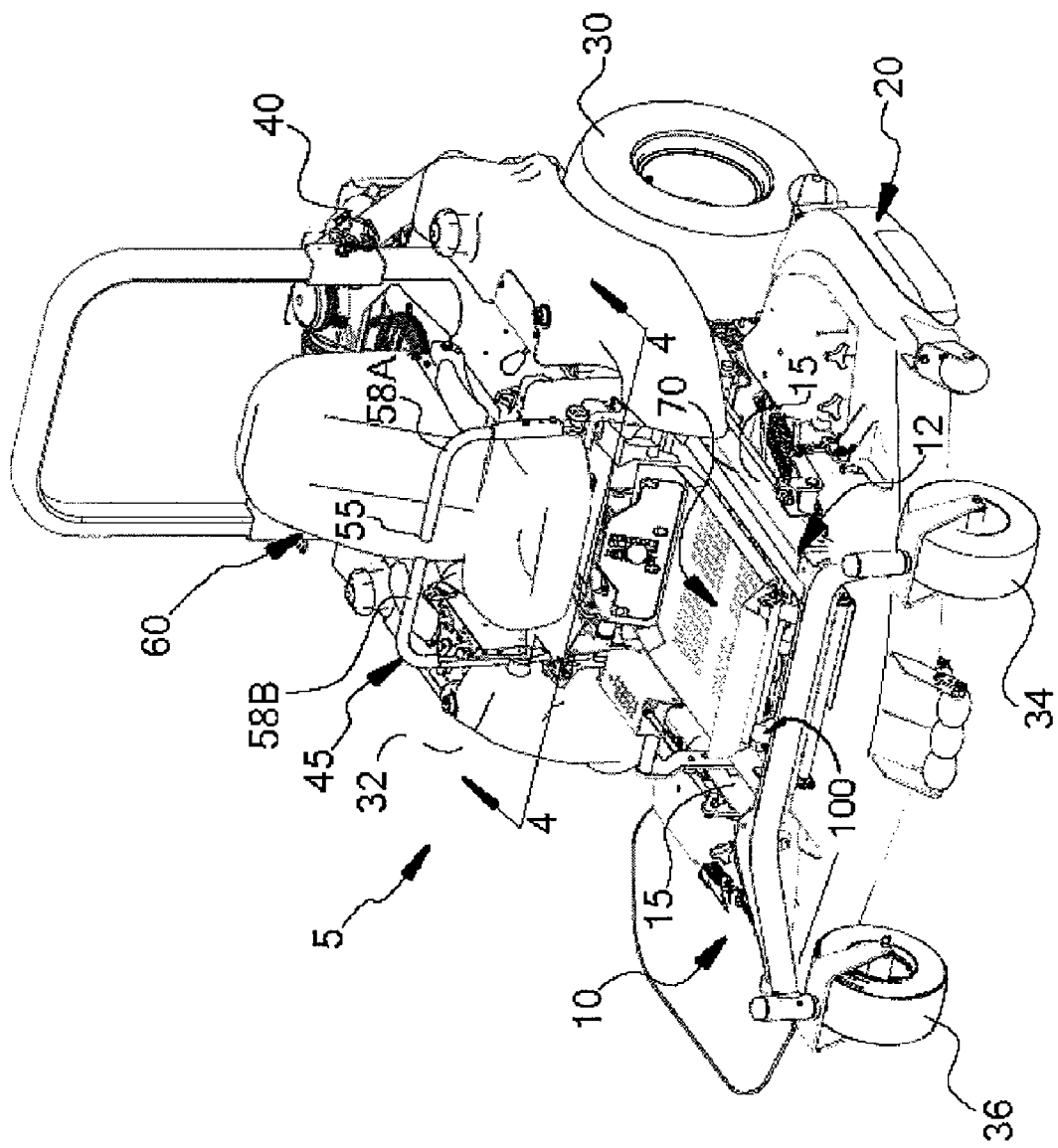
FIG. 1 is an isometric view of a ride-on mower incorporating a suspended operator platform in accordance with the present invention.

The drawings illustrate a preferred exemplary embodiment of the invention as incorporated into a self-propelled, ride-on mower 5. It should be understood, however, that the invention is usable with other mowers and other light utility type vehicles as well. With respect to the embodiment of a ride-on mower illustrated in the accompanying drawings, it will be appreciated that like reference numerals represent like parts throughout the drawings.

Figure 2:
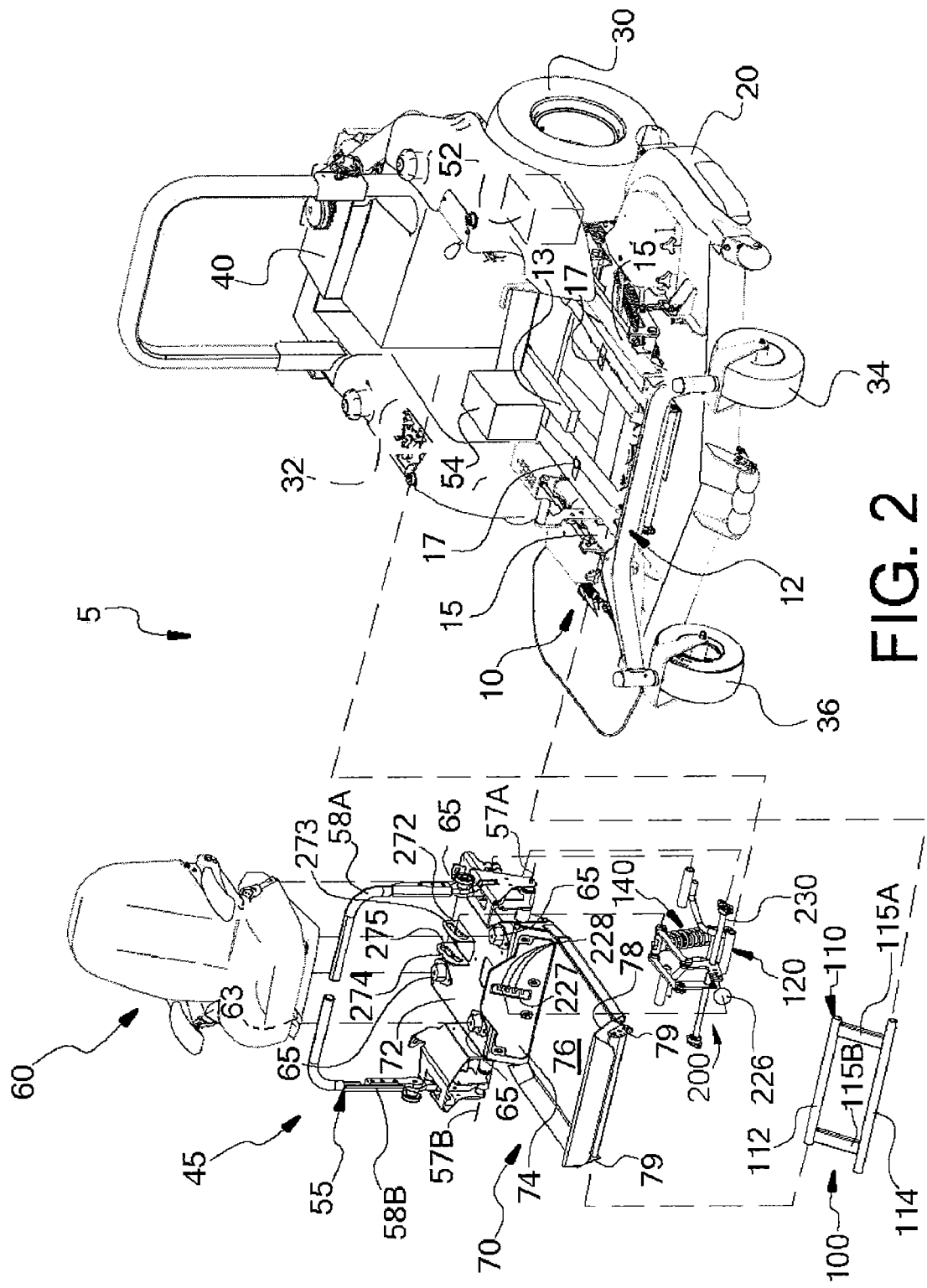
FIG. 2 is a partially exploded isometric view of the ride-on mower shown in FIG. 1.

Referring initially to FIGS. 1 and 2, a self-propelled, ride-on mower 5 is configured as a zero-turn lawnmower and includes a chassis 10, an operator platform 70, and a suspension system 100 that suspends the operator platform 70 from the chassis in a manner that isolates an operator from vibrations, or shock-type or other loads that are generated on or by the mower 5 during use or result from driving the mower 5 across uneven terrain, explained in greater detail elsewhere herein. As mentioned above, those loads are individually and collectively referred to herein as "shock loads" for the sake of conciseness. A drive train is supported in a generally rigid manner in chassis 10 that includes a frame 12 with a frame middle rail 13 (FIG. 2) and outer frame rails 15 extending in a generally horizontal direction, the frame rails having bumpstops 17 (FIG. 2) that limit downward travel of the operator platform 70 relative to the chassis 10. Mower deck 20 is supported by frame 12, typically by being suspended from the frame by a system of chains and/or linkages. Mower deck 20 can be a multi-blade cutting deck, including multiple rotating cutting blades that are positioned and driven in a conventional manner. It is noted that deck 20 could alternatively be a single blade cutting deck. It is also appreciated that deck 20 is movably attached to frame 12, thereby allowing a user to specify a distance of deck 20 from a cutting surface to provide a number of desired cutting heights. A deck adjustment lever, which is part of a deck height and leveling assembly, allows an operator to raise and lower deck 20 as desired. A suitable deck height and leveling assembly is seen in U.S. application Ser. No. 11/945,734, filed Nov. 27, 2007, and entitled "Lawnmower Cutter Deck with Independently Operable Deck Leveler Assemblies" which is incorporated herein by reference in its entirety. Deck 20 is provided between a pair of independently driven drive wheels 30 and 32 and a pair of casters 34, 36, at the rearward and forward portions of the chassis 10, respectively.

Still referring to FIGS. 1 and 2, drive wheels 30, 32 are operatively connected to an engine 40, while casters 34, 36 are undriven and are pivotally attached to a front portion of frame 12. Engine 40 sits on the frame 12, toward the back of the ride-on mower 5. A control system 45 is provided on opposing sides of seat assembly 60 in which the operator sits during use. The operator manipulates control system 45 to operate the mower.

Figure 7:
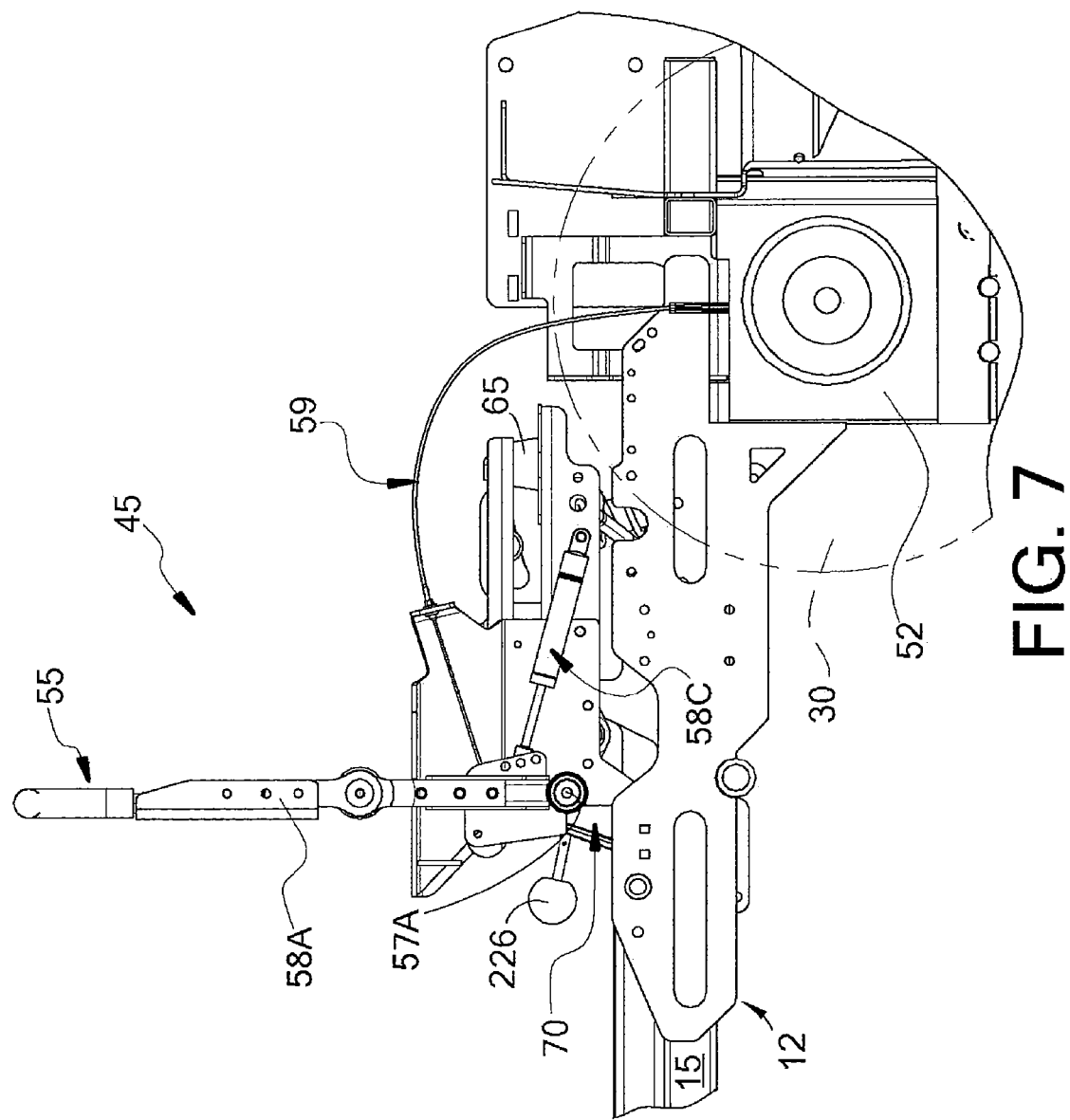
FIG. 7 is a left-side elevation view of portions of the steering controls of the ride-on mower shown in FIG. 1.

Referring to FIGS. 2 and 7, a pair of hydraulic drives 52, 54 are mounted on the chassis 10 and drive the drive wheels 30, 32, with each hydraulic drive 52, 54 being associated with and driving a dedicate one of the drive wheels 30, 32. Each hydraulic drive 52, 54 preferably includes a pump and a motor that are combined to form a single unit, each unitary or combined pump and motor of the hydraulic drives 52, 54 being mounted sufficiently low on the chassis 10 so as to contribute to a relatively low center of gravity of the mower 5. Combining the pumps and motors also further reduces the number of moving parts. Preferably, each pump of the hydraulic drives 52, 54 is an axial-piston type pump which includes an internal tilting swash plate (not shown) which can be rotated to vary the pump discharge rate from a zero flow, also referred to as neutral, up to a maximum flow in either the forward or reverse directions. A pair of calibration bodies, or other suitable tuning controls, cooperates with the pumps allowing an operator to calibrate the output of each respective pump so that mower 5 moves in a straight line when no turning function is being performed. Preferably, the pumps have fan blades that are mounted to ends of pump shafts and which produce heat dissipating air flows around the hydraulic drives 52, 54. The motor of each hydraulic drive 52 or 54 is a piston motor that is mechanically and fluidly connected to the associated pump and that transmits torque to an integrated axle of the drive 52 or 54 via an internal gear train.

Still referring to FIGS. 2 and 7, control system 45 includes steering controls 55 that cooperate with the hydraulic drives 52, 54 for rotating the drive wheels 30, 32. Steering controls 55 include a pair of levers 58A, 58B that are pivotally attached to the operator platform 70, as seen best in FIG. 7. Still referring to FIG. 7 and shown with respect to components on the left side of the mower 5, lever 58A is connected by a push/pull cable 59 to a swash plate actuator on the left hydraulic drive 52. A second push/pull cable (not shown) connects lever 58B and a swash plate on the right hydraulic drive 54 on the right side of the mower 5, although not show. Moving the levers 58A, 58B pushes and/or pulls the cables which correspondingly move the swash plate actuators so as to result in forward, rearward, and/or turning motion of the mower 5 depending on the direction and magnitude of movement of the levers 58A, 58B. Cylinders (only one of which is shown at 58C) are connected to the levers 58A, 58B and the operator platform 70 to resist steering lever movement in order to impart "feel" to a steering operation.

Still referring to FIGS. 2 and 7, pivoting the levers 58A, 58B in a common direction forward or backward from a neutral position result in forward or reverse propulsion of the mower 5 at a speed proportional to the magnitude of pivoting, allowing two-lever controlled equipment manipulation techniques are used for maneuvering the mower. For instance, turning to the left or right while propelling the mower 5 can be achieved by "stroking" or pivoting the levers 58A, 58B different distances about lateral pivot axes 57A, 57B (only one of which is shown at 57A in FIG. 7) from the neutral position, but in a common direction, and zero-radius turns are achieved by pivoting the levers 58A, 58B a common distance from the neutral position, but in opposite directions.

Referring now to FIG. 2, the seat assembly 60 is positioned with respect to the control system 45 so that the operator has comfortable access to the levers 58A, 58B and other components of the control system 45. Operator comfort is further enhanced by suspending the operator platform 70, the seat assembly 60, and the levers 58A and 58B from the rigid chassis 10 by the suspension system 100. The seat assembly 60 is mounted on the platform 70 by isolation mounts 65 that further reduce the imposition of shock loads to the operator and that permit limited movement of the seat relative the operator platform 70.

Figure 3:
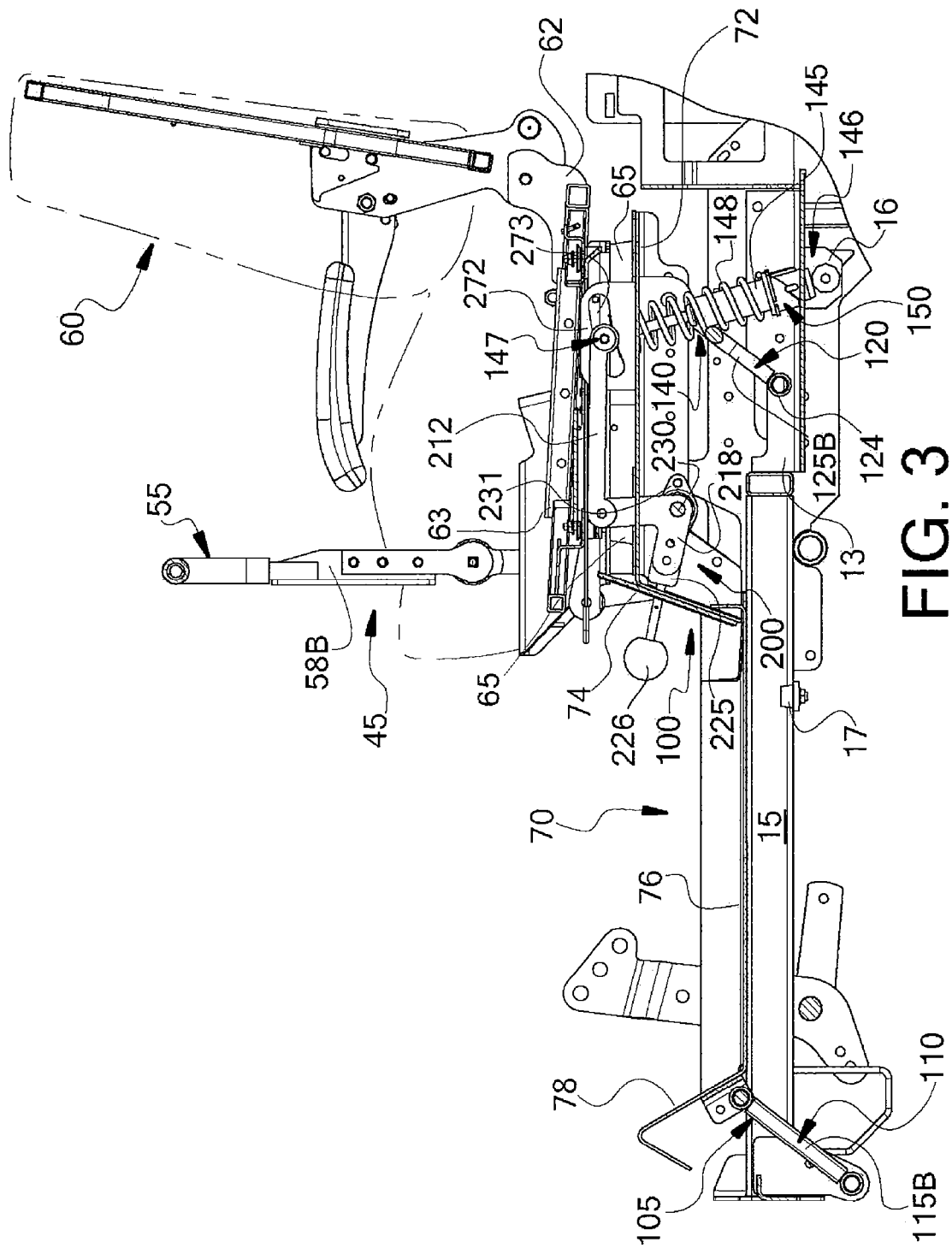
FIG. 3 is a left-side sectional view of the operator platform, portions of the chassis, and other portions of the mower shown in FIG. 1.

Referring to FIGS. 2 and 3, seat assembly 60 includes a pan 62 to which a track 63 is mounted, the track 63 allowing forward and backward position adjustment of the seat assembly 60 relative to the platform 70. Four isolation mounts 65 mount corners of the pan 62 on a seat support tier 72 of the operator platform 70. The isolation mounts 65 reduce the imposition of vibrations to the operator and also provide a secondary suspension for the operator, supplementing the suspension system 100. They also permit limited movement of the seat assembly 60 relative to the platform, improving the "ride" or "feel" by, for example, reducing the amount of vibrations and/or other dynamic forces that can be transferred through the seat and felt by the operator. The isolation mounts 65 are made from an elastomeric material and provide compliance in all directions, with greater compliance preferably being provided horizontally than vertically, whereby less force is required to flex the isolation mounts 65 in a transverse direction than is required to longitudinally compress the isolation mounts 65. Each isolation mount 65 of this embodiment is a so-called "five to one" mount that is 5 times more compliant horizontally than vertically. Each isolation mount 65 includes a relatively narrower top portion 66 (FIG. 4) and a relatively wider bottom portion 67 (FIG. 4) that are defined along a conically tapering sidewall.

Referring still to FIGS. 2 and 3, a wall 74 extends angularly down from a front portion of the seat support tier 72 of the operator platform 70 and connects the seat support tier 72 to a planar horizontal pan or foot support tier 76 that defines a front portion of the operator platform 70. The front end of the foot support tier 76 forms an upwardly angled shelf 78.

Referring again to FIGS. 1 and 2, suspension system 100 is configured to support an entire body of the operator, the operator platform 70, and the components attached to the operator platform 70 such as steering controls 55. A combined weight of all of these defines a sprung weight that is supported by the suspension system 100. Substantially the rest of the mower 5 is considered "rigid" or defines an unsprung weight of the mower 5, whereby the chassis 10, the mower deck 20, and the engine 40, are not supported by the suspension system 100. Such components of the mower 5 that are not supported by the suspension system 100 are generally represented by the subassembly of major mower 5 components seen on the right side of FIG. 2. This configuration of suspension system 100 enhances operator comfort by isolating the entire operator, including the operator's hands and feet, from shock loads. Isolating the mower deck 20 from the suspension system 100 prevents scalping that could otherwise occur if the mower deck 20 were to move with the suspension system 100 during a breaking operation. Isolating the mower deck 20, chassis 10, engine 40, hydraulic drives 52, 54, etc. from the suspension system 100 dramatically reduces the mass that otherwise would be supported by the suspension system 100, increasing the responsiveness of the suspension system.

Referring now to FIGS. 2, 3, 5, and 6, the suspension system 100 of this embodiment includes a linkage system 105 and a spring/shock system 140 that supports the operator platform 70 and suspends it from the chassis 10 as a unit. The linkage system may comprise any system of links or connectors that permit the operator platform 70 to move up and down as a unit, either vertically or in a swinging motion, while still inhibiting or preventing rolling or pitching, yawing, and linear side to side motion. For example, a system of bell cranks or similar links could be employed. In the present embodiment, the linkage system 105 takes the form of a parallelogram linkage system. Parallelogram linkage system 105 includes front and back linkages 110, 120 that connect the front and back portions of the operator platform 70 to the chassis 10 and establish a travel path along which the operator platform 70 can move while the suspension system 100 flexes during use.

Referring now to FIG. 2, front linkage 110 extends angularly between the chassis 10 and the shelf 78 of foot support tier 76, extending upwardly and rearwardly toward the back of the mower 5. It includes an upper cross-bar 112 and a lower cross bar 114 that extend transversely across the chassis 10. A pair of posts 115A, 115B extends between and connects the upper and lower cross-bars 112, 114 to each other. Ends of the upper cross-bar 112 are pivotally connected to brackets 79 that extend from opposing sides of the shelf 78. Ends of the lower cross-bar 114 are pivotally connected to the opposing sides of the frame 12. This allows the front linkage 110 to pivot about the attachment points between the upper cross-bar 112 and the operator platform 70 and between the lower cross-bar 114 and the frame 12.

Figure 5:
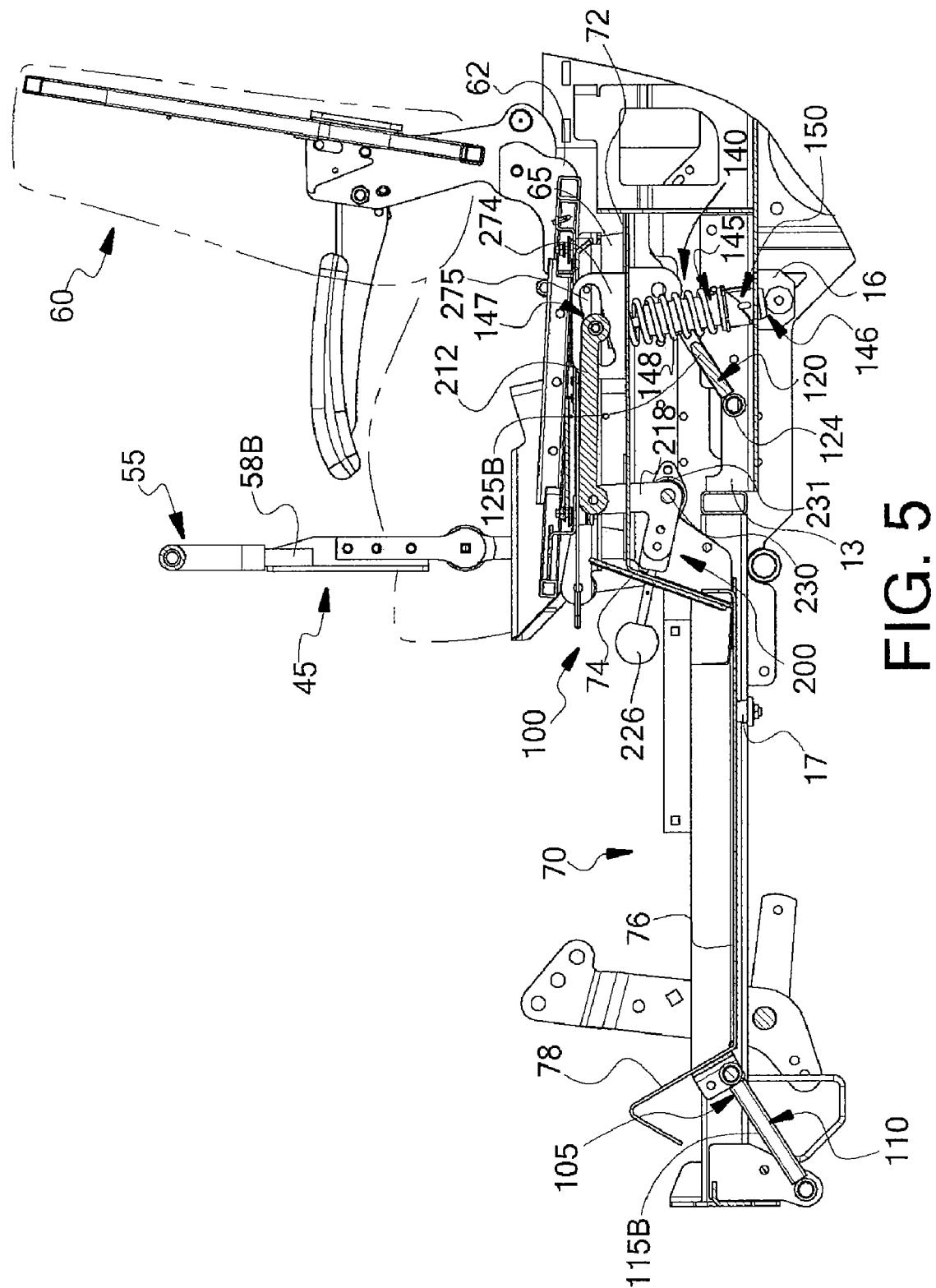
FIG. 5 is a left-side sectional view of the operator platform and other mower components shown in FIG. 3, with the operator platform of the suspension system fully compressed.
Figure 6:
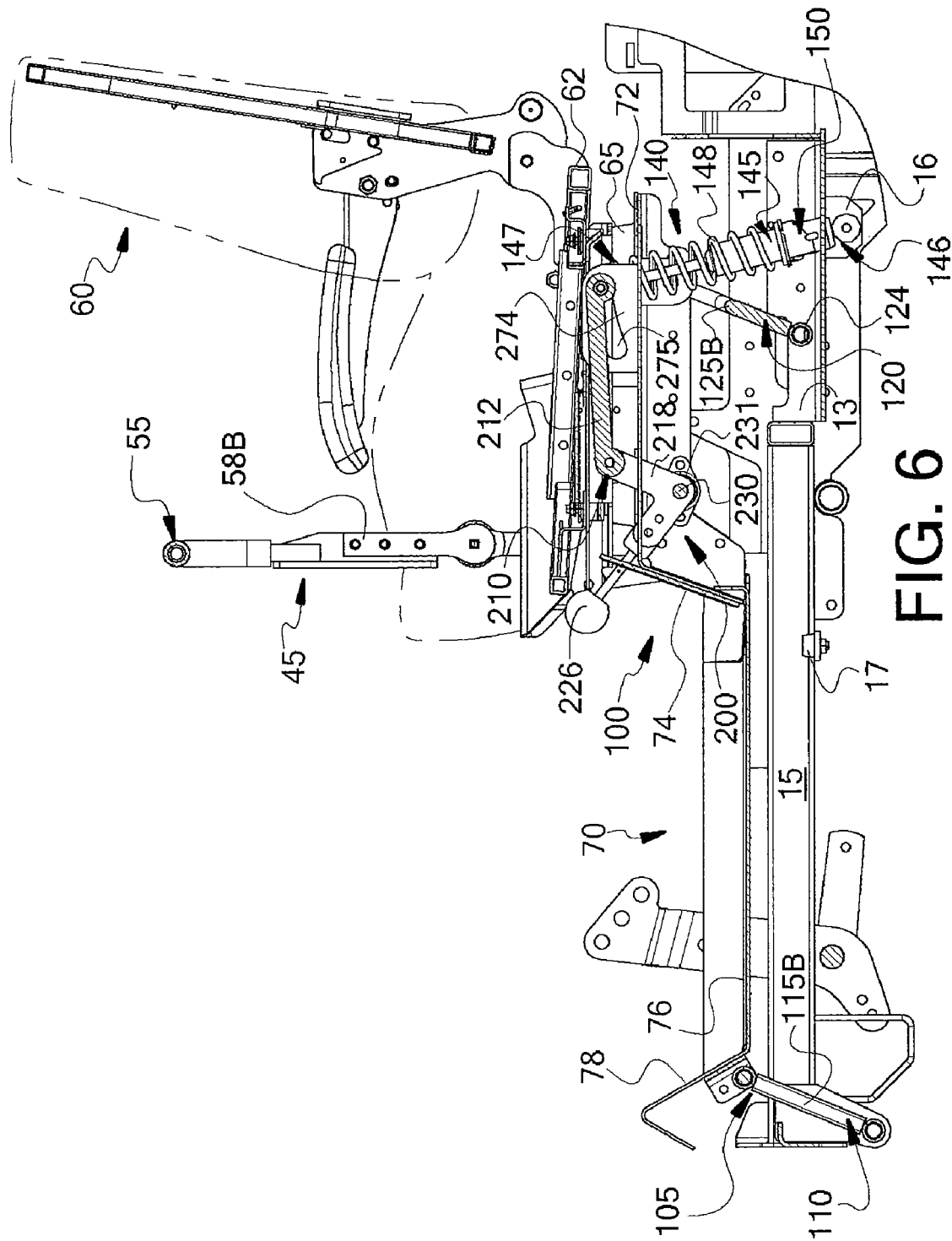
FIG. 6 is a left-side sectional view of the operator platform and other mower components shown in FIG. 3, with the operator platform of the suspension system fully extended.

Comparing the raised and lowered operator platforms 70 shown in FIGS. 5 and 6, it can be seen that the lower and upper pairs of attachment points between the front linkage 110 and chassis and operator platform 70, respectively, define horizontal pivot axes that are parallel to each other and extend transversely with respect to the mower 5. This configuration transversely captures the front of the operator platform 70 while allowing primarily vertical translation of the platform 70 with respect to the chassis 10, along with limited longitudinal translation of the platform 70 with respect to the chassis 10, while substantially eliminating or preventing (i) transverse swaying of the operator platform 70 with respect to the chassis 10, (ii) rolling or pitching of the operator platform 70 about its longitudinal axis, and (iii) yawing of the operator platform 70 about an upright axis extending through a middle portion of the chassis 10.

Figure 4:
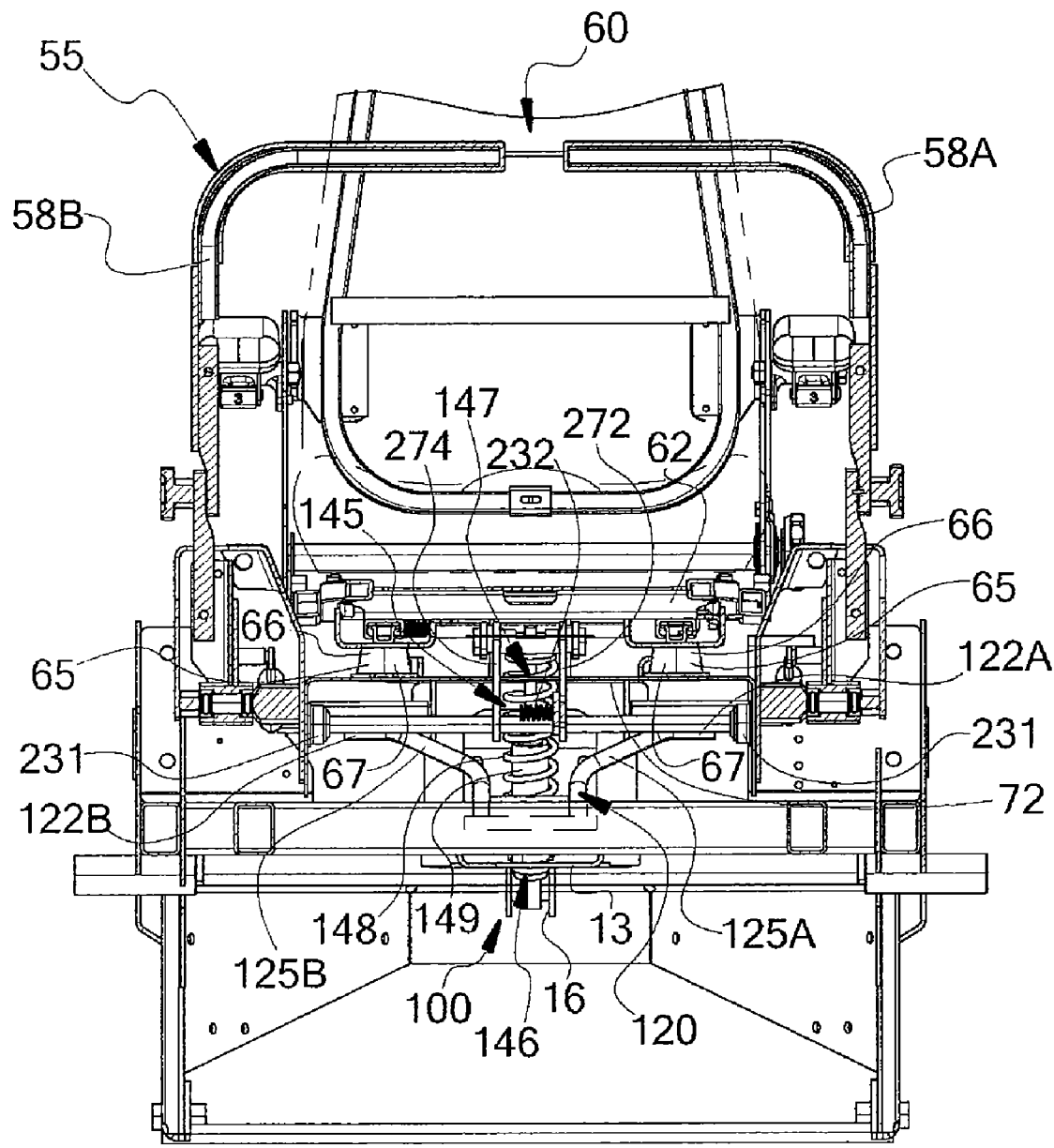
FIG. 4 is a cross sectional view, taken generally along line 4-4 in FIG. 1.

Referring now to FIGS. 2-4, back linkage 120 is mounted higher upon the chassis 10 than the front linkage 110, extending angularly between the chassis 10 and seat support tier 72 and generally parallel to the front linkage 110 and thus also toward the back of mower 5. As compared to the front linkage 110, back linkage 120 has a relatively Y-shaped configuration (FIG. 2) with a split upper cross-bar or upper cross-bars 122A, 122B, and a relatively narrower lower cross-bar 124 when compared to the lower cross bar 112 of the front linkage 110. Posts 125A, 125B are connected to the upper cross-bars 122A, 122B and extend angularly toward each other, at upper segments thereof, while lower segments of the posts 125A, 125B extend from the upper segments, parallel to each other, and are connected to opposing ends of the lower cross bar 124. Each of upper cross-bars 122A, 122B of back linkage 120 is pivotally connected to brackets or flanges that extend from opposing sides of the seat support tier 72 of the operator platform 70. Ends of the lower cross-bar 124 of the back linkage 120 are pivotally connected to a frame middle rail 13 that extends longitudinally along the center line of the mower 5. Such pivoting connections allow the back linkage 120 to pivot about the attachment points between the upper cross bars 122A, 122B and the seat support tier 72 and between the ends of the lower cross-bar 124 and the frame middle rail 13.

Referring now to FIGS. 2-6, similar to the pivot axes of the front linkage 110, the lower and upper attachment points between the back linkage 120 and frame middle rail 13 and operator platform 70 define a pair of horizontal pivot axes, with each axis being parallel to the other and extending transversely across the mower 5. Furthermore, the back linkage 120 also transversely captures the operator platform 70 while permitting vertical and some longitudinal translation of the operator platform 70 with respect to the chassis 10. Correspondingly, the front and back linkages 110, 120 of the parallelogram linkage system 105 cooperate with each other to require the operator platform 70 to move as a unit, substantially in a vertical direction while being biased upwardly to a default position by the spring/shock system 140. A partially loaded position of the operator platform 70 is seen in FIG. 3, which the operator platform 70 may assume when an operator is seated in the seat assembly 60 and the mower is standing still or traveling but not traversing rough terrain. A lowered or fully loaded position of the operator platform 70, in which the platform 70 contacts bumpstops 17 of the chassis 10, the parallel linkage system 105 is folded down, and the suspension system 100 is fully compressed, is seen in FIG. 5. A raised position of the operator platform 70, in which the suspension system 100 is fully extended without any weight on the platform, is seen in FIG. 6.

Figure 9:
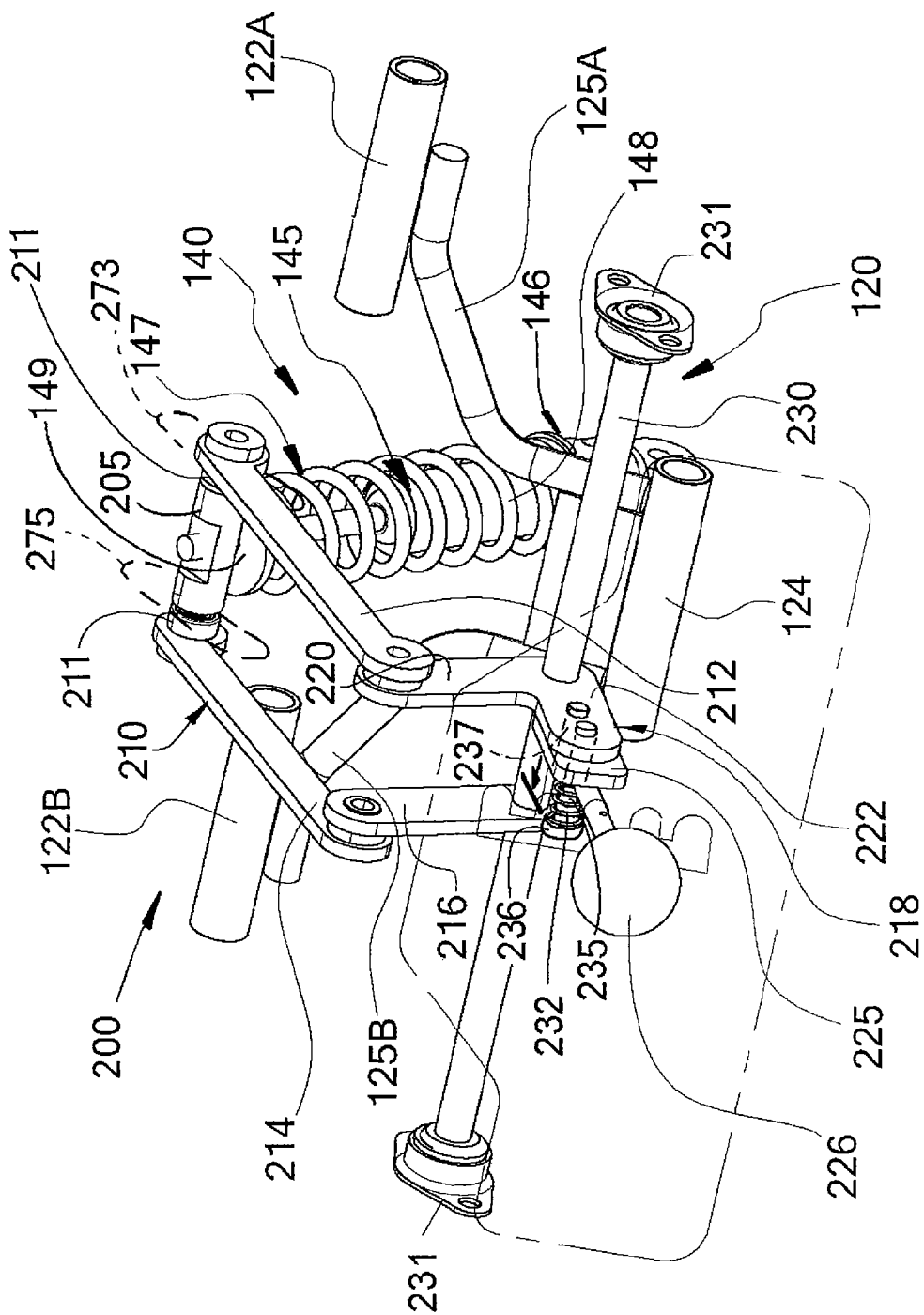
FIG. 9 is a close-up isometric view of the fine-stiffness adjuster shown in FIG. 2.
Figure 10:
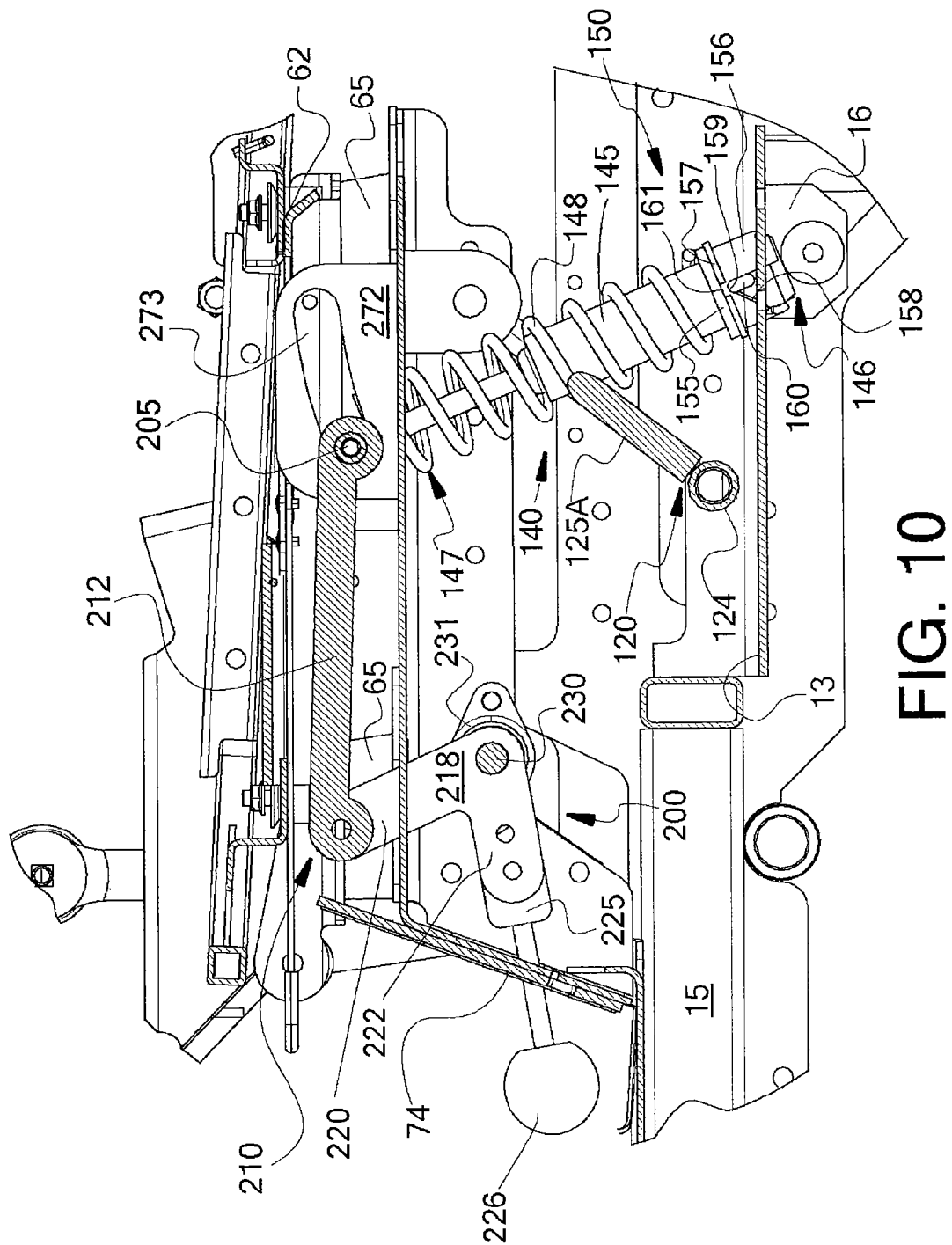
FIG. 10 is a close up, left-side sectional elevation view of a portion of the suspension system of the ride on-mower shown in FIG. 1.

Referring now to FIGS. 2-4 and 9, spring/shock system 140 of this embodiment has a mono-shock configuration and is provided toward the back of the suspension system 100. Spring/shock system 140 includes a single coil-over type shock absorber having a damper 145 and a coil spring 148 that is concentrically housed around the damper 145. The damper 145 includes a lower end 146 and an upper end 147 that are axially movable relative to one another. The lower end 146 extends through an opening in the frame middle rail 13 and is pivotally connected to a yoke 16 (FIGS. 3 and 4) that is connected to and extends below the frame middle rail 13 (FIGS. 3 and 4). The upper end 147 of the damper 145 extends through an opening in the seat support tier 72 of the operator platform 70 and is held between a pair of plates 272, 274 that are on opposing sides of the opening and extend orthogonally downwardly from the seat support tier 72. The upper end 147 is retained in arcuate slots 273, 275 (FIG. 2) in the plates 272, 274 by a horizontal cross pin 205 (FIGS. 9 and 10). The plates 272, 274 are positioned forward of the lower end 146 of the damper 145, so that the upper end 147 tilts forward, toward the front of the mower (FIG. 3), to a variable extent which is explained in greater detail elsewhere herein.

The force with which the spring 148 biases the operator platform 70, corresponding to a suspension flexing stiffness, can be modified by the operator by way of a course-stiffness adjuster 150 and a fine-stiffness adjuster 200.

Figure 11:
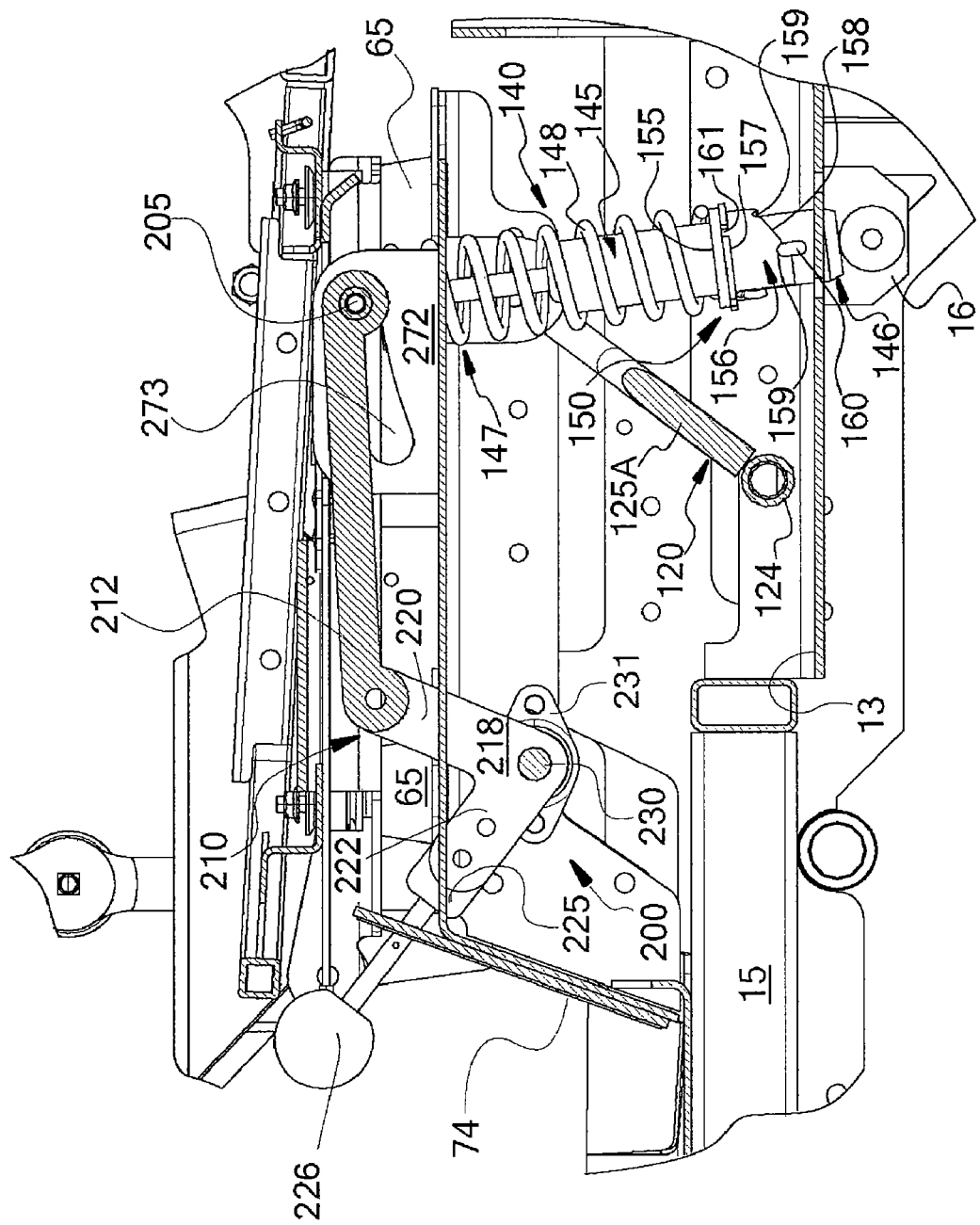
FIG. 11 is a variant of the close up, left-side sectional elevation view of the portion of the suspension system shown in FIG. 10.

Referring now to FIGS. 9, 10, and 11, course-stiffness adjuster 150 allows for changing a preload setting of the spring 148 so as to accommodate for body weight differences of different classes of users by providing a broad range of flexing stiffness settings or relatively large scale adjustment increments of flexing stiffness settings of the suspension system 100. An upper end of spring 148 is fixed or captured with respect to an upper end of the damper 145 by resting against a fixed cup or seat 149 (FIG. 9). The course-stiffness adjuster 150 includes a cup or plate 155 that supports a lower end of the spring 148 and that is moveable along a longitudinal axis of the spring 148 and damper 145 so as to establish a position of the lower end of the spring 148, thus establishing a preload on the spring and, accordingly, establishing a stiffness of the suspension system 100.

Still referring to FIGS. 10 and 11, the preload of the spring 148 can be adjusted by adjusting the axial location of the plate 155 relative to the upper seat 149 and then retaining the plate 155 in a particular location, axially along the damper 145. In the present embodiment, this adjustment is performed using a course adjuster in the form of a collar-like cam 156 that extends concentrically at least partially around the damper 145, below the bottom of the spring 148. An upper annular wall 157 of cam 156 abuts a lower surface that is formed integrally with or otherwise supports the plate 155. A ramped lower wall 158 of the cam 156 has recesses 159 that are axially and circumferentially spaced from each other. At any given time, one of the recesses 159 engages a fixed projection 160 extending radially outwardly from the tubular surface of the damper 145. Rotating the cam 156 to any of three positions causes one of the three recesses 159 to rest on the projection 160, hence setting the position of the upper annular wall 157 and plate 155 along the length of the damper 145 and thus the extent to which the spring 148 is preloaded. More preloading of spring 148 provide a stiffer flexing of the suspension system 100 and less preloading of the spring 148 provides a softer flexing of the suspension system 100. The cam 156 can be rotated by engaging circumferentially spaced slots 161 in the bottom of the cam with a spanner wrench (not shown) and then rotating the spanner wrench.

Referring now to FIGS. 2 and 8-11, fine-stiffness adjuster 200 allows for adjusting suspension flexing stiffness within a narrower range of setting when compared to, and being fully encompassed within, the range of stiffness settings provided by the course-stiffness adjuster 150. The fine-stiffness adjuster 200 is configured to adjust the suspension stiffness so as to accommodate for, for example, terrain differences encountered by each user while operating the ride-on mower or intended operating speeds of the mower 5 so that a stiffer setting can be used for faster operating speeds and a softer setting can be used for slower operating speeds. It also permits the stiffness to be tailored to the prevailing desires of a particular user. Importantly, this adjustment can be performed by a seated operator using a simple knob 226 and adjustment lever 225.

Referring now to FIG. 9, fine-stiffness adjuster 200 includes the pin 205 which, as discussed above, extends transversely through the upper end 147 of the damper 145 and which is supported in arcuate slots 273, 275 in the plates 272, 274 (FIG. 2). The lever 225 is coupled to the pin 205 by a spring linkage 210. Spring linkage 210 has a pair of horizontal legs 212, 214 (FIG. 9), each of which is pivotally connected to the pin 205 at its rear end. A pair of bearings 211 is provided between the rear ends of horizontal legs 212, 214 and the ends of pin 205 to rollably support the plates 272, 274 of the operator platform 70 on the spring/shock system 140. A front end of horizontal leg 214 is pivotally connected to an upper end of an upright link 216. A lower end of the upright link 216 is attached to a shaft 230 that is supported at its ends and allowed to rotate by way of a pair of bearings 231. Shaft 230 supports a v-link 218 at a vertex portion of the v-link 218, from which upper and lower legs 220, 222 of the v-link 218 extend angularly away from each other. V-link 218 is axially movable with respect to the shaft 230 while being locked in rotational unison with the shaft 230. An outer end of the upper leg 220 of the v-link 218 is pivotally connected to a front end of horizontal leg 212. An outer end of lower leg 222 of the v-link 218 is bolted to an adjustment lever 225 with a pair of bolts 235, 237.

Still referring to FIG. 9, ends or caps of the bolts 235, 237 are spaced from the adjustment lever 225 which allows the adjustment lever 225 to move with respect to the lower leg 222 of v-link 218, in a direction that is parallel to the longitudinal axis of shaft 230. In this way, the adjustment lever 225 is movable axially along the bolts 235, 237, within the clearances between the ends or caps of the bolts 235, 237 and the lower leg 222 of v-link 218. A spring 232 is provided concentrically around a shaft of bolt 235, between a head 236 of bolt 235 and the adjustment lever, so that the spring 232 biases the adjustment lever 225 away from a head 236 of the bolt 235, toward the lower leg 222 of v-link 218. In this way, in a default state, the spring 232 holds corresponding surfaces of adjustment lever 225 and lower leg 222 of v-link 218 in a face-to-face abutment.

Figure 8:
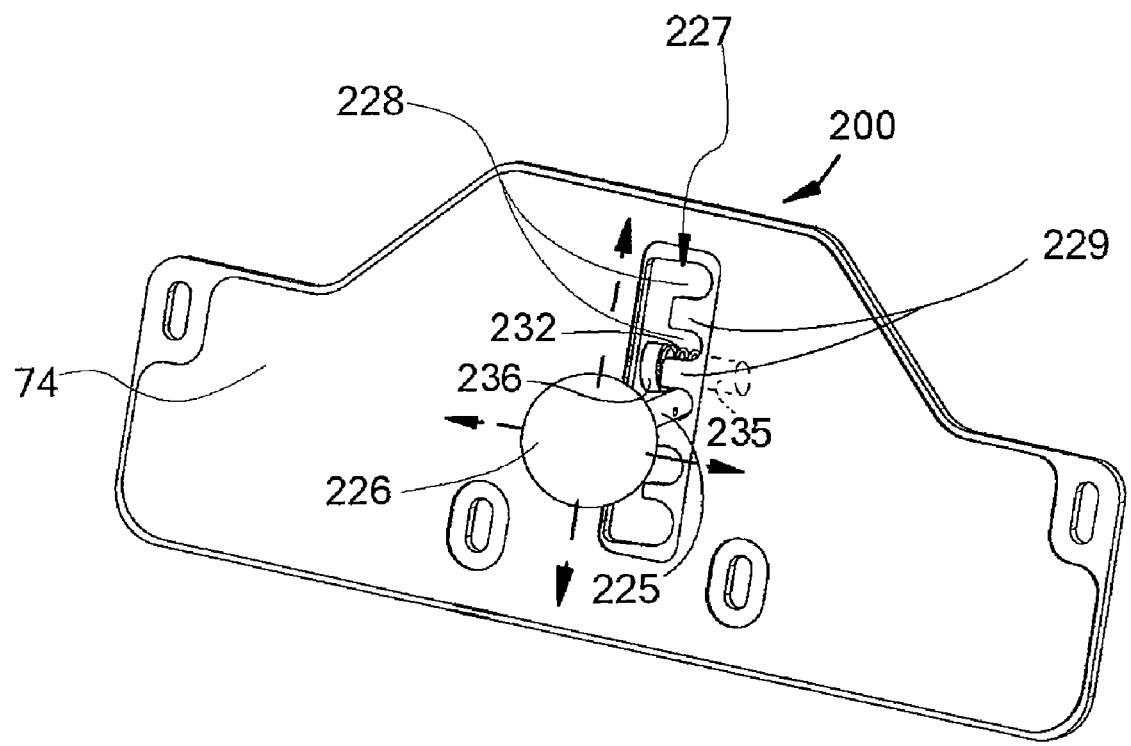
FIG. 8 is an isometric view of portions of the fine-stiffness adjuster extending through a wall of the operator platform shown in FIG. 2.

Referring now to FIGS. 8 and 9, in a default state, the adjustment lever 225 sits in one of multiple slots 228 that are defined between adjacent tabs 229 which extend from the wall 74, into a generally vertical opening 227 in the wall 74 of the operator platform 70. The previously mentioned knob 226 is attached to an end of the adjustment lever 225 and provides a structure for the operator to grasp while manipulating the adjustment lever 225. Accordingly, the operator uses knob 226 to pull adjustment lever 225 out of a slot 228 and into the opening for repositioning the adjustment lever 225 into a different one of the slots 228. After aligning the adjustment lever 225 with a selected slot 228, the operator releases the knob 226, whereby spring 232 pushes the adjustment lever 225 away from the center line of the opening 227 and into one of respective slot 228.

Referring again to FIG. 9, shaft 230 defines a pivot axis of the upright link 216 and v-link 218, so that when an operator manipulates the knob 226, vertical movement of the adjustment lever 225 and lower leg 222 of v-link 218 drives the horizontal legs 212, 214 of the spring linkage 210 fore and aft to move the pin 205 along the arcuate slots 273, 275 in the plates 272, 274 by rolling the bearings 211 along the edge-like surfaces of the plates 272, 274 that are defined at the perimeters of and face into the arcuate slots 272, 275.

Referring now to FIGS. 8-11, the position of the adjustment lever 225 along the length of the opening 227 determines the angle of the spring/shock system 140 with respect to the operator platform 70 and, more importantly, the position of the spring/shock system 140 with respect to the front and back linkages 110, 120. However, since the front and back linkages 110, 120 are parallel to each other and pivot about their respective axis in unison to allow unitized movement of the operator platform 70, effects of changing position of the angle of the spring/shock system 140 with respect to the back linkage 120 alone are discussed here while appreciating that the same concepts are applicable at least by analogy to the front linkage 110. Referring still to FIGS. 8-11, adjusting stiffness of the suspension system 100 depends on the angle of the spring/shock system 140 with respect to the back linkage 120 because the stiffness is, generally speaking, proportional to the magnitude of the angle defined between the spring 148 of the spring/shock system 140 and the back linkage. The closer the back linkage 120 and spring/shock system 140 are to being perpendicular to each other, the stiffer flexing of the suspension (FIG. 10). The closer the back linkage 120 and spring/shock system 140 are to being parallel to each other, the softer flexing of the suspension (FIG. 11).

Referring now to FIG. 10, lowering the adjustment lever 225 toward the bottom of the opening 227 moves the pin 205 forward along and the bearings 211 (FIG. 8) through the slots 273, 275 which tilts the upper end 147 of the damper 145 and the spring 148 forward and down, closer to being perpendicular to the back linkage 120. In this position, the biasing force supplied by the spring 148 is closer to directly opposing the direction of movement of the back linkage 120. In the stiffer flexing of the suspension seen in FIG. 10, for a given distance of movement of the operator platform 70, the spring 148 is compressed a distance that closely approximates or corresponds to a distance that the back linkage 120 travels.

Referring now to FIG. 11, conversely, raising the adjustment lever 225 toward the top of the opening 227 moves the pin 205 rearward along an the bearings 211 (FIG. 8) through the slots 273, 275 and tilts the upper end 147 of the spring/shock system 140 rearward and up, closer to being parallel to the back linkage 120. In this position, the biasing force supplied by the spring 148 is further from directly opposing the direction of movement of the back linkage 120, when compared to the position the spring/shock system 140 of FIG. 10. In the softer flexing of the suspension seen in FIG. 11, for a given distance of movement of the operator platform 70 and back linkage 120, the spring 148 is compressed a lesser distance than when compared to the position the spring/shock system 140 of FIG. 10 and contributing to such softer feel.

Referring again to FIGS. 8-11, these adjustments can be performed simply and easily by a seated operator simply grasping the knob 226, moving the adjustment lever 225 out of one of the slots 228, raising or lowering the adjustment lever 225 within the opening 227 into alignment with another desired slot 228, and releasing the knob so as to let the spring 232 force the adjustment lever 225 into the desired slot 228.

As indicated above, many changes and modifications may be made to the present invention without departing from the spirit thereof. The scope of some of these changes is discussed above. The scope of others is apparent from the appended claims.

What we claim is:

1. A riding utility vehicle, comprising:
a chassis that supports a drive train;
a seat;

an operator platform that supports the seat and an entire body of an operator during use of the utility vehicle;

a suspension system connecting the operator platform to the chassis and permitting relative movement therebetween, the suspension system having a variable stiffness and including a stiffness adjuster that is adjustable for varying the stiffness of the suspension system, the stiffness adjuster being operable by a seated operator; and steering controls for directing movement of the utility vehicle, the steering controls being connected to and moving in unison with the operator platform.

2. The riding utility vehicle of claim 1, the suspension system further comprising a spring that biases the operator platform toward a default position and (i) a course-stiffness adjuster that is configured to adjust a preload setting of the spring, and (ii) a fine-stiffness adjuster that is configured to adjust an angle defined between the spring and the operator platform.

3. The riding utility vehicle of claim 2, the course-stiffness adjuster further comprising (i) a seat that supports the spring and that is moveable along a longitudinal axis of the spring, and (iii) a cam that at least indirectly engages the seat, and wherein the cam is vertically movable relative to the operator platform to correspondingly move the seat to advance or regress with respect to the longitudinal axis of the spring so as to vary a preload on the spring.

4. The riding utility vehicle of claim 2, the fine-stiffness adjuster further comprising (i) a spring linkage that is connected to the spring, and (ii) a movable lever that is connected to the spring linkage, and wherein movement of the lever is translated through the spring linkage so as to vary an inclination of the spring with respect to at least one of the chassis and the operator platform.

5. The riding utility vehicle of claim 2, further comprising a seat and at least one elastomeric isolation mount connecting the seat to the operator platform to reduce transmission of vibrations therebetween.

6. The riding utility vehicle of claim 2, further comprising a seat and at least one isolation mount connecting the seat to the operator platform and reducing transmission of vibrations therebetween, the isolation mount including a top portion and a bottom portion, the isolation mount being (i) transversely flexible so as to move the top and bottom portions transversely with respect to each other, and (ii) longitudinally compressible so as to move the top and bottom portions closer to each other, and wherein less force is required to transversely flex the isolation mount than is required to longitudinally compress the isolation mount a common distance.

7. The riding utility vehicle of claim 1, the suspension system further comprising a bump-stop attached to the chassis and limiting downward travel of the operator platform with respect to the chassis.

8. The riding utility vehicle of claim 1, wherein the steering controls comprise a steering lever and a cylinder that is connected to the steering lever and that resists steering lever movement.

9. The riding utility vehicle of claim 1, the suspension system further comprising a front linkage that extends angularly between the chassis and a front portion of the operator platform and a back linkage that extends angularly between the chassis and a back portion of the operator platform, wherein the front and back linkages restrict movement of the operator platform to at least one of (i) vertical, and (ii) fore and aft movements respect to the chassis.

10. The riding utility vehicle of claim 1, wherein the vehicle is a lawnmower.

11. A riding utility vehicle, comprising:
a chassis that supports a drive train;
a seat;
an operator platform that supports the seat and an entire body of an operator during use of the utility vehicle;
a suspension system connecting the operator platform to the chassis, the suspension system including (i) a front linkage that extends angularly between the chassis and a front portion of the operator platform, and (ii) a back linkage that extends angularly between and interconnects the chassis and a back portion of the operator platform so as to restrict movement of the back portion of the operator platform to movement along a generally vertical travel path.

12. The riding utility vehicle of claim 11, further comprising steering controls for directing movement of the utility vehicle, the steering controls being connected to and moving in unison with the operator platform.

13. The riding utility vehicle of claim 11, further comprising a stiffness adjuster that controls suspension flexing stiffness as the operator platform moves with respect to the chassis.

14. A utility vehicle, comprising:
a chassis that supports a drive train and that defines a front portion and a rear portion;
a seat;
an operator platform that supports the seat and an entire body of an operator during use of the utility vehicle and that defines a front portion and a rear portion; and
a linkage system connecting the front portion of the operator platform to the front portion of the chassis and connecting the rear portion of the operator platform to the rear portion of the chassis, the linkage system allowing vertical movement of the operator platform with respect to the chassis and substantially preventing (i) transverse swaying of the operator platform with respect to the chassis, (ii) rolling of the operator platform about a longitudinal axis of the platform, and (iii) yawing of the operator platform about an upright axis extending longitudinally through the chassis.

15. The utility vehicle of claim 14, the linkage system further comprising a back linkage that connects the back portion of the operator platform to the back portion of the chassis and a front linkage that connects the front portion of the operator platform to the front portion of the chassis.

16. The utility vehicle of claim 15, wherein a combination of the front and rear linkages, the operator platform, and the chassis, forms a parallelogram linkage assembly.

17. The utility vehicle of claim 14, further comprising a spring that supports the operator platform.

18. The utility vehicle of claim 17, wherein an angle defined between the spring and a rear linkage of the linkage system is adjustable by a seated operator of the utility vehicle.

19. The utility vehicle of claim 18, further comprising a spring linkage that is connected to the spring and movable lever that is connected to the spring linkage, wherein movement of the lever is translated through the spring linkage so as to adjust the angle defined between the spring and the rear linkage.

20. A riding utility vehicle, comprising:
a chassis that supports a drive train;
a seat;
an operator platform that supports the seat and an entire body of an operator during use of the utility vehicle;
a suspension system connecting the operator platform to the chassis and permitting relative movement therebetween;

steering controls for directing movement of the utility vehicle, the steering controls being connected to and moving in unison with the operator platform;

a stiffness adjuster that adjusts the stiffness of the suspension system, the stiffness adjuster being operable by a seated operator.

21. A riding utility vehicle, comprising:
a chassis that supports a drive train and a mower deck;
a seat;
an operator platform that supports the seat and an entire body of an operator during use of the utility vehicle;
a suspension system connecting the operator platform to the chassis and including
(i) a course-stiffness adjuster that is configured to adjust a suspension stiffness setting within a first range of stiffness settings, and
(ii) a fine-stiffness adjuster that, with respect to each of the first range of settings, is configured to adjust the suspension stiffness setting within a second range of stiffness settings.

22. The riding utility vehicle of claim 21, the suspension system further comprising at least one linkage that permits vertical travel of the operator platform with respect to the chassis and that transversely captures the operator platform with respect to the chassis so as to substantially prevent (i) transverse swaying of the operator platform with respect to the chassis, (ii) rolling of the operator platform about a longitudinal axis of the platform, and (iii) yawing of the operator platform about an upright axis extending through the chassis.

23. The riding utility vehicle of claim 21, the course-stiffness adjuster further comprising a spring having a variable preload setting, and wherein varying the preload setting of the spring so that the spring is relatively more compressed in a default state provides a relatively stiffer flexing of the suspension, and varying the preload setting of the spring so that the spring is relatively less compressed in the default state providing a softer flexing of the suspension.

24. The riding utility vehicle of claim 21, the fine-stiffness adjuster further comprising a spring that has a variable angle between the spring and the operator platform, and wherein changing the variable angle between the spring and the operator platform adjusts the suspension between a relatively stiffer flexing of the suspension and a relatively softer flexing of the suspension.

25. The riding utility vehicle of claim 24, the fine-stiffness adjuster further comprising a handle that is connected to the spring, such that movement of the handle correspondingly changes the variable angle between the spring and the operator platform.

26. A ride-on mower, comprising:
a chassis that supports a drive train and a mower deck;
an operator platform that supports an entire body of an operator during use of the ride-on mower;
left and right steering control levers that are mounted on and move with the operator platform;
a seat that is supported on the operator platform;
elastomeric isolation mounts disposed between the seat and the operator platform; and
a suspension system connecting the operator platform to the chassis and permitting relative movement therebetween, the suspension system including;
a spring/shock system that maintains the operator platform in a fully raised position when no operator is on the operator platform;
a stiffness adjuster connected to the spring/shock system and controlling the stiffness of the suspension as the operator platform moves with respect to the chassis, the stiffness adjuster being operable by a seated operator to adjust the stiffness of the suspension;
a front linkage that extends angularly between the chassis and a front portion of the operator platform; and
a back linkage that extends angularly between the chassis and a back portion of the operator platform.

27. A method of operating a utility vehicle having a suspension system that connects an operator platform to a chassis while permitting relative movement with respect thereto, the operator platform supporting a seat, the method comprising:
establishing a first setting of a suspension flexing stiffness;
operating the ride-on mower; and
while an operator is upon the ride-on mower, adjusting the suspension performance characteristic to a second setting that provides either (i) a relatively softer flexing of the suspension, or (ii) a relatively stiffer flexing of the suspension, with respect to the first setting.

* * * * *